United States Patent

Magner

[11] 3,866,839
[45] Feb. 18, 1975

[54] TORCH HEAD CONSTRUCTION
[76] Inventor: Edward J. Magner, 197 Elk St., Buffalo, N.Y. 14210
[22] Filed: Aug. 2, 1974
[21] Appl. No.: 494,058

[52] U.S. Cl............ 239/416.5, 239/424.5, 239/600, 266/23 P
[51] Int. Cl.............................................. B05b 7/06
[58] Field of Search ....... 239/390, 391, 424, 416.5, 239/424.5, 600; 266/23 P

[56] References Cited
UNITED STATES PATENTS
3,575,354 4/1971 Hach, Jr. ................... 239/424.5 X
3,583,643 6/1971 Ollivier et al. ................... 239/424.5
3,648,934 3/1972 Goss ........................... 239/424.5 X Primary Examiner—M. Henson Wood, Jr.
Assistant Examiner—Michael Mar
Attorney, Agent, or Firm—Bean & Bean

[57] ABSTRACT

A torch head is fitted with an extension assembly incorporating a valve device permitting selective attachment of simply formed cutting or welding tips to the head. The extension assembly additionally incorporates flash back preventing valve devices.

6 Claims, 5 Drawing Figures

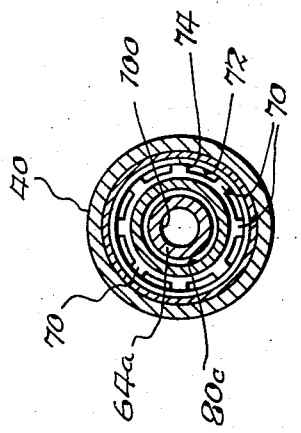
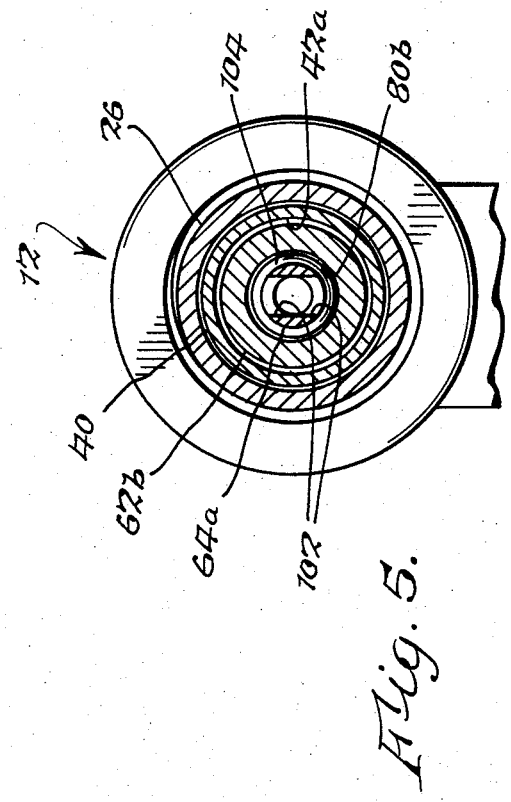
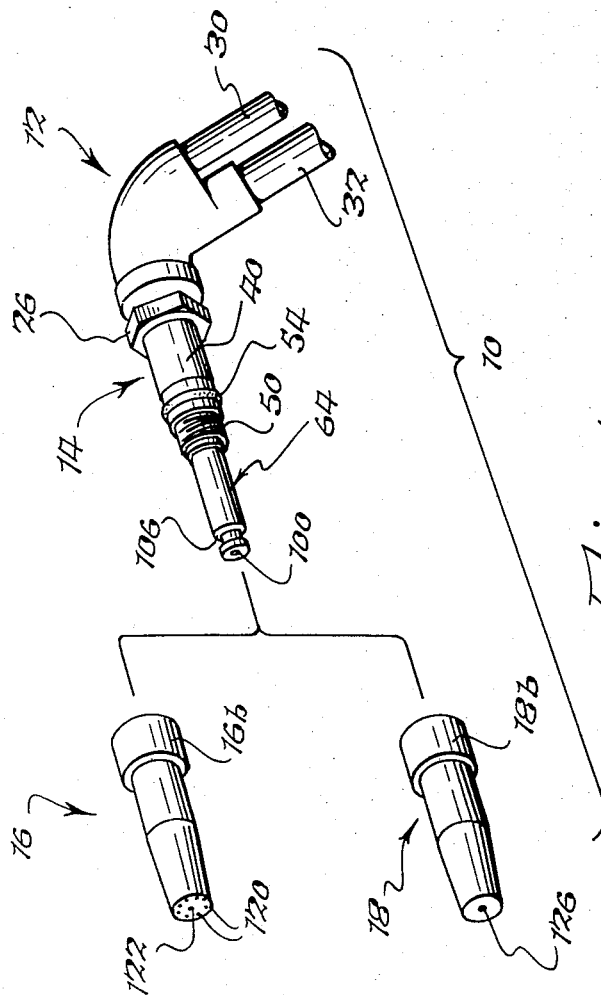

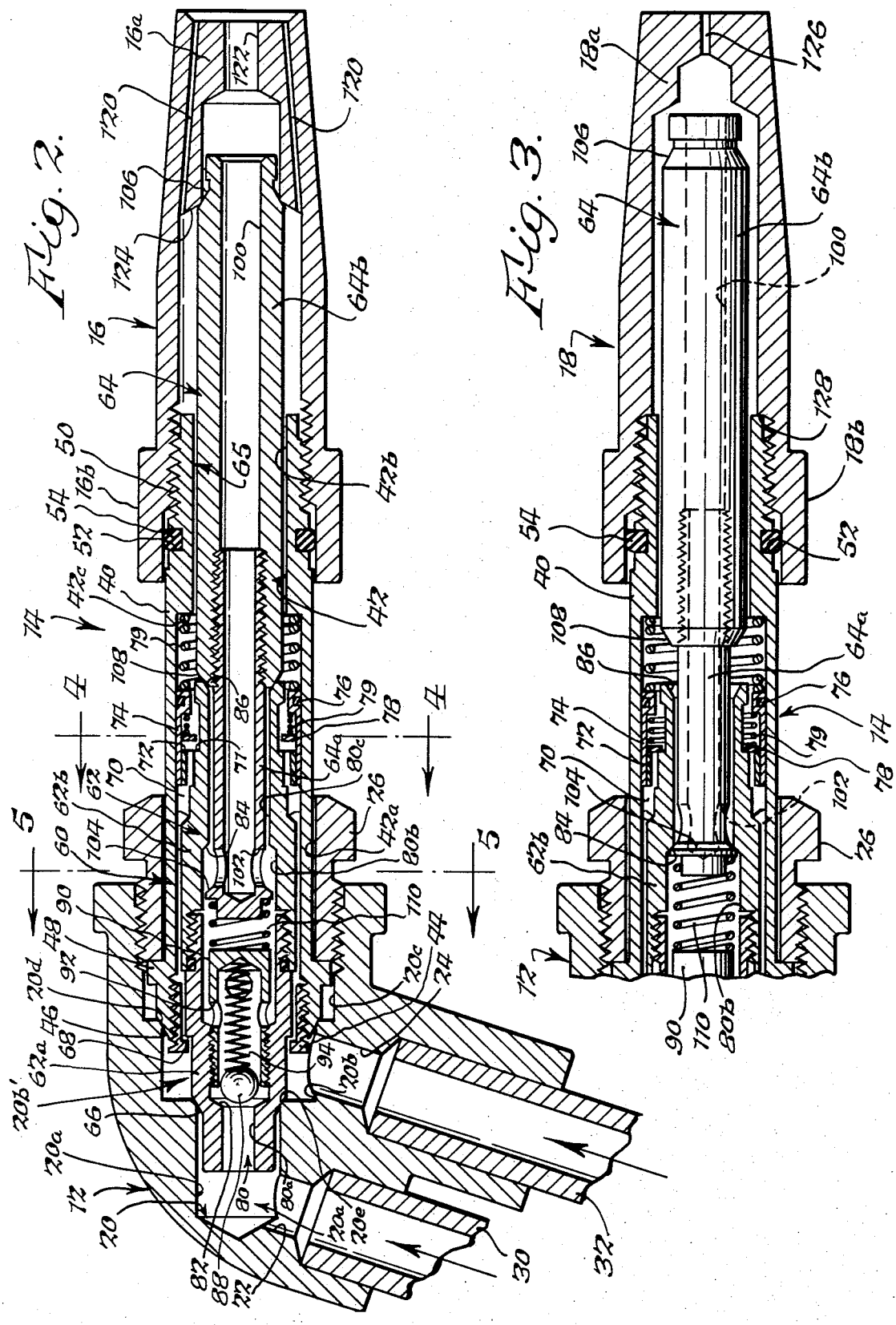

TORCH HEAD CONSTRUCTION

BACKGROUND OF THE INVENTION

Prior attempts have been made to design a torch head to accommodate diverse types of tips, as evidenced for instance by U.S. Pat. Nos. 1,424,189; 1,471,694; 2,157,269 and 3,648,934.

SUMMARY OF THE INVENTION

The present invention is directed towards an improved torch head construction, which may be employed to perform either cutting or welding operations merely be changeably mounting, simply designed and fabricated cutting and welding tips.

The present construction features an extension assembly, which may be removably or permanently fitted on an otherwise conventional torch head and threaded to selectively receive cutting and welding tips. The extension assembly defines separate oxygen and fuel gas passageways communicating with oxygen and fuel gas inlet ports of the torch head and features the provision of a valve device, which serves to normally block the oxygen passageway. The valve device includes an operator, which cooperates only with the cutting tip to open the valve device to complete the oxygen passageway and connect same to atmosphere through an oxygen opening defined by the cutting tip. The welding tip is inwardly configured to prevent valve device opening engagement thereof with the operator when attached to the extension assembly, thereby to prevent discharge of oxygen in the event of an unintentional manipulation of a manual oxygen control during a welding operation.

The present construction particularly desirable from the standpoint that the tips employed may be simply and relatively inexpensively formed; this providing a substantial damaged tip replacement cost savings over the expected life of the extension assembly and torch head.

The extension assembly also includes flash back preventing valve devices.

DRAWINGS

The nature and mode of operation of the present invention will now be more fully described in the following detailed description taken with the accompanying drawings wherein:

FIG. 1 is a perspective view of the torch head construction of the present invention illustrating the manner of attaching either a cutting or welding tip;

FIG. 2 is a vertical sectional view taken through the torch head construction with a cutting tip attached;

FIG. 3 is a view similar to FIG. 2, but with a welding tip attached;

FIG. 4 is a sectional view taken generally along line 4—4 in FIG. 2; and

FIG. 5 is a sectional view taken generally along line 5—5 in FIG. 2.

DETAILED DESCRIPTION

Reference is now made particularly to FIG. 1, wherein 10 is employed to designate the improved torch head construction of the present invention. This construction includes a torch head 12; an extension assembly 14 fitted to head 12; and a series of essentially uniformly sized and externally configured tips including for instance cutting and welding tips 16 and 18, respectively, which may be selectively mounted on assembly 14.

By reference to FIG. 2, it will be understood that head 12 may be of conventional construction, such as that disclosed in U.S. Pat. No. 3,648,934. However, for purposes of further reference, head 12 is shown as being of the type having an end opening socket 20; an oxygen inlet port 22, which opens into socket base portion 20a; a fuel gas inlet 24, which opens into the enlarged socket intermediate portion 20b; and a mounting or clamping nut 26, which is threaded into socket outer end portion 20c for the purpose of retaining extension assembly 14 fixed in a fluid sealed relationship relative to the torch head. Conduits 30 and 32 are employed to connect inlet ports 22 and 24, respectively, to sources of oxygen and a suitable combustible gas, such as acetylene, which typically includes valve means for controlling the flow of combustible gas and the mixing of oxygen with such gas before it is passed to conduit 32, as well as separate manually operated valve means to selectively permit passage of oxygen through conduit 30 only when a cutting operation is to be performed.

Assembly 14 is shown in FIG. 2 as including an outer sleeve or mounting member 40, which is formed with an axially through stepped bore opening 42 having an enlarged diameter rearwardly disposed or inner end portion 42a partially threaded to receive a motion limiting or stop sleeve 44, and a forwardly disposed or outer reduced diameter end portion 42b; portions 42a and 42b being connected by a radially extending and rearwardly facing annular stop or abutment surface 42c. The outer surface of member 40 is stepped to define a rearwardly disposed annular sealing or inner end surface 46; an annular flange or stop 48, which is engageable by nut 26 for the purpose of forcing sealing surface 46 into fluid sealing contact with a torch head sealing surface 20d formed adjacent the juncture of socket portions 20b and 20c; a forwardly disposed or outer end surface 50, which is threaded to removably mount or attach tips 16 and 18; and an annular groove 52 adapted to receive an O-ring type seal 54 for sealing against tips 16 and 18.

Assembly 14 also includes a flow passageway and valve defining inner assembly 60, which is telescopically arranged within sleeve 40 and includes a rearwardly disposed end or valve seat defining portion 62 and a forwardly disposed end or valve operator portion 64. As will become apparent, sleeve 40 and inner assembly 60 cooperate to define an annular fuel gas passageway 65 which opens through front and rear ends of sleeve 40.

Valve seat portion 62, which is preferably formed by threadably connecting axially aligned inner and outer portions 62a and 62b, has its outer surface shaped to define a rearwardly facing annular sealing surface 66 engageable with annular sealing surface 20e formed adjacent the juncture of socket portions 20a and 20b; a rearwardly facing annular stop or abutment surface 68; and a plurality of annularly spaced, inner assembly centering or fuel gas flow guide ribs 70, which extend radially adjacent an annular sealing surface 71. With this construction, the rearwardly disposed end of valve seat portion 62 cooperates with head socket portion 20a to define an oxygen chamber 20a', whereas the rearwardly disposed ends of portion 62 and sleeve 40 cooperate with head socket portion 20b to define a fuel gas chamber 20b' arranged in flow communication with the rearwardly disposed end of fuel gas passageway 65.

Ribs 70 are radially stepped to positionally receive a ring member 72 and the rear end portion of a concentrically outwardly disposed stepped diameter centering sleeve 74, which are both preferably brazed to ribs 70. Sleeve 74 carries an O-ring type seal 76 adjacent its forward end for the purpose of providing a fluid seal between sleeve 74 and sleeve 40. Rib 70 and sleeve 74 serve to center the inner assembly within sleeve 40 while permitting axially directed movement therebetween.

As will be understood from viewing FIGS. 2 and 3, the forwardly facing edges of ribs 70 and ring 72 and sealing surface 71 cooperate to define a valve seat portion of a fuel gas passageway flash back preventing valve device, which additionally includes a ring shaped valve or closure member 78. A coil spring 79 is employed to normally bias valve member 78 rearwardly into a closed condition illustrated in FIG. 3, but is adapted to radially deform to permit member 78 to move into an open condition illustrated in FIG. 2, whenever pressure in fuel gas passageway 65 upstream of this valve device exceeds that present downstream, as during a normal welding or cutting operation. Although the fuel gas passageway flash back preventing valve is a highly desirable feature of the present construction, it may of course be omitted without adversely effecting the overall mode of operation of the present torch head construction.

A coil spring 79, which is arranged to bear on the forward end of sleeve 74 and stop surface 42c, serves to normally bias surface 66 into fluid sealing engagement with a sealing surface 20e. It will be understood that prior to fitting assembly 14 onto head 12, engagement of stop surface 68 with sleeve 44 or other suitable retainer serves to retain portion 62 assembled within sleeve 40 against the bias of spring 79. However, when assembly 14 is fitted into head 12, the spacing between torch head annular sealing surfaces 20d and 20e is such that portion 62 is forced by engagement with sealing surface 20e to move relatively forward within sleeve 40 against the bias of spring 79, whereby to remove stop surface 68 from engagement with sleeve 44 so as to establish a gas flow path between fuel gas chamber 20b' and the rear end of fuel gas passageway 65.

Valve seat portion 62 is also formed with an axially extending passageway 80, which is stepped to define passageway portions 80a, 80b and 80c; a rearwardly disposed, forwardly facing valve seat 82; an intermediate rearwardly facing valve seat 84; and a forwardly disposed, forwardly facing valve seat 86. Valve seat 82 forms a part of an oxygen passageway flash back preventing valve device, which additionally includes a ball valve part or element 88 disposed within a threadably mounted cup shaped housing 90 having side opening ports 92. Ball device 88 is normally biased for sealing engagement with valve seat 82 by a relatively weak spring 94, which may readily deform to place passageway portions 80a and 80b in flow communication upon the introduction of oxygen into chamber 20a', as during a normal cutting operation. This particular flash back valve may be omitted without adversely influencing the overall mode of operation of the present torch head construction.

Operator 64 is preferably formed by threadably connected axially aligned inner and outer portions 64a and 64b; inner portion 64a being slideably supported within forwardly disposed passageway portion 80c between valve seats 84 and 86, and outer portion 64b being loosely received within opening end portion 42b of sleeve 40. More particularly, operator 64 is formed with a front end opening passageway 100, which opens radially adjacent its rear end through ports 102; forwardly facing valve head surfaces 104 and 106; and a rearwardly facing valve head surface 108. Valve head surfaces 102 and 108 are adapted to alternately seat in sealing engagement with valve seats 84 and 86, respectively, whereby to define the limits of axially directed movements of operator 64 relative to valve seat portion 62 between rearwardly retracted or oxygen passageway open and forwardly extended or oxygen passageway closed positions shown in FIGS. 2 and 3, respectively. Suitable means, such as a coil spring 110, arranged intermediate housing 90 and the rear or inner end of operator 64 is employed to normally bias the latter into its closed position. The seating engagement of valve head surface 108 with valve seat 86 serves to prevent flow communication between mix points of the fuel gas and oxygen passageways whenever operator 64 is moved into oxygen passageway open position in the manner to be described. Alternatively, an O-ring or other suitable sealing device may be arranged within passageway portion 80c in order to provide a permanent or continuously operative fluid seal between the midpoints of these gas flow passageways.

Again referring to FIGS. 2 and 3, it will be understood that tips 16 and 18 are also similar in design from the standpoint that they have a generally cup shaped configuration, including base or end wall portions 16a and 18a and side wall or mounting portions 16b and 18b whose rims are internally threaded to facilitate removable attachment to sleeve 40. More specifically, tip 16 is formed with a plurality of annularly spaced fuel gas openings 120, which are disposed concentrically of an axially extending or centrally disposed oxygen opening 122 extending through base wall 16a; and a valve seat 124, which is arranged concentrically intermediate the fuel gas and oxygen openings and axially positioned to seat against valve head surface 106 as tip 16 is threaded onto sleeve 40. In the preferred form of tip 18 illustrated in FIG. 3, the inner surface of the side wall 18b is stepped to define an abutment 128, which engages with the forwardly disposed end of sleeve 40 when the tip is threaded onto the sleeve in order to maintain the inner surface of end wall 18a in a forwardly spaced relationship relative to the front end of operator 64. The positioning of valve seat 124 is such as to insure fluid sealing engagement between surfaces 86 and 108, as well as the removal of valve head surface 104 from engagement from valve seat 84, before tip 16 is fully threaded onto sleeve 40, as indicated in FIG. 2. On the other hand, tip 18 is formed with a single centrally disposed fuel gas opening 126 and is "hollowed out" sufficiently to prevent engagement of the inner surface of end wall 18a with valve head surface 106 when tip 18 is fully threaded onto sleeve 40.

When an operator desires to perform a welding operation, it is only necessary for him to first screw tip 18 onto sleeve 40 until stop 128 engages the forward end of the sleeve and then manually manipulate the valve device or devices conventially provided for controlling the flow of fuel gas from a suitable source to conduit 32. When this has been accomplished, the pressure of fuel gas within passageway 65 upstream of the fuel gas flash back preventing valve serves to unseat valve member 78 against the bias of spring 79 in order to place fuel gas opening 126 in flow communication with chamber 20b'. Operator 64 remains in its closed position, wherein surfaces 84 and 104 cooperate to prevent passage of fuel gas rearwardly into the intermediate portion 80b of the oxygen passageway. However, the relatively loose fit of operator inner portion 64a within passageway portion 80c permits flow of fuel gas into the rear end of passageway 100 through ports 102, unless a separate valve device, not shown, is arranged within portion 80c. The engagement of surfaces 84 and 104 also serves to prevent the potentially dangerous or destructive discharge of oxygen into the forward ends of the fuel gas and oxygen passageways in the event that the operator accidentally operates the oxygen source valve device controlling delivery of oxygen to conduit 30. This is a particularly important feature of the present invention from the standpoint of safety.

If the operator subsequently desires to perform a cutting operation, the fuel gas control valve device is first closed and then tip 18 is removed and replaced by tip 16. As tip 16 is threaded onto sleeve 40, surface 124 is first brought into engagement with surface 106 to provide a fluid seal between the forward ends of the fuel gas and oxygen passageways and to subsequently force operator 64 into valve open position wherein ports 102 are placed in flow communication with passageway portion 80b and surfaces 86 and 108 are engaged to provide a fluid seal between the midpoints of the fuel gas and oxygen passageways. After this has been accomplished, the operator may proceed with a cutting operation by manually operating the source associated valve devices to supply fuel gas and oxygen to conduits 32 and 30, respectively. The resultant pressurization of chambers 20b' and 20a' serves to inseat valve members 78 and 88, and permit passage of fuel gas and oxygen to openings 120 and 122, respectively, for discharge to the atmosphere. Should a high back pressure or flash back condition be encountered adjacent the downstream ends of either of the fuel gas or oxygen passageways, valve members 78 and/or 88 will automatically close and remain closed to retard flame propagation until the downstream pressure returns to normal atmospheric pressure.

From the foregoing, it will be readily appreciated that I have devised a novel torch head construction featuring an extension assembly adapted to selectively receive one of a series of similarly sized and simply constructed torch tips including cutting and welding tips without requiring any prior modification of the extension assembly to accommodate any given tip. Moreover, the extension assembly principally features an oxygen passageway valve device, which is operable to block accidental, potentially dangerous discharge or flow of oxygen through the oxygen passageway, except when a cutting tip is mounted on the extension assembly and oxygen discharge is desired.

I claim:

1. A torch head construction comprising in combination:

a torch head defining an end opening socket and oxygen and fuel gas inlet ports entering said socket at points spaced lengthwise thereof;

an extension assembly having a sleeve and an inner assembly extending lengthwise within said sleeve, said inner assembly having a rearwardly disposed end seated within said socket and cooperating therewith to define an oxygen chamber communicating with said oxygen inlet port, said inner assembly defining an oxygen passageway opening adjacent said rearwardly disposed end into said oxygen chamber and opening through a forwardly disposed end of said inner assembly, said sleeve having a rearwardly disposed end portion seated within said socket and cooperating therewith and said inner assembly to define a fuel gas chamber communicating with said gas inlet port, said sleeve and said inner assembly additionally cooperating to define a fuel gas passageway opening into said fuel gas chamber adjacent said rearwardly disposed end portion and opening through a forwardly disposed end portion of said sleeve, said inner assembly defining a valve device including an operator defining said forwardly disposed end of said inner assembly and movable between forwardly extended and rearwardly retracted positions for blocking and unblocking flow of oxygen through said oxygen passageway, respectively, and means for normally maintaining said operator in said forwardly extended position; and a series of torch tips removably mounted one at a time to said forwardly disposed end portion of said sleeve, said series of tips including welding and cutting tips of generally cup-shaped configuration characterized as including base walls and side walls having tip mounting rim portions, said welding tip having an essentially centrally disposed fuel gas outlet opening extending through said base wall thereof, said cutting tip having an essentially centrally disposed oxygen outlet opening and a plurality of gas outlet openings arranged radially outwardly of said oxygen opening extending through said base wall thereof, said welding tip having means engageable with said sleeve for maintaining an inner surface of said base wall thereof disposed forwardly of said operator, and said cutting tip having an inner surface of said base wall thereof arranged to engage said operator to provide a fluid seal peripherally of said oxygen opening thereof and said oxygen passageway and to maintain said operator in said rearwardly retracted position.

2. A torch head according to claim 1, wherein said inner assembly includes axially inner and outer portions, said inner portion defining said rearwardly disposed end and an axially extending through opening forming a rear part of said oxygen passageway and being stepped to define a rearwardly facing seat of said valve device, said outer portion being said operator and being slidably supported within a forward portion of said through opening, said operator carrying adjacent a rear end thereof a valve head of said valve device and defining a front opening passageway forming a front part of said oxygen passageway and at least one port radially connecting the rear of said front opening with said through opening forwardly of said valve head, and said means for normally moving said operator in said forwardly extended position including a spring arranged within said through opening for biasing said valve head forwardly into engagement with said valve seat thereby to define said forwardly extend position.

3. A torch head according to claim 2 wherein a forwardly disposed end of said through opening defines a forwardly facing valve seat, said operator defines a rearwardly facing valve head arranged forwardly of said valve device and engageable with said forwardly facing valve seat to simultaneously define said rearwardly retracted position and to provide a fluid seal between said forwardly disposed end of said through opening and said fuel gas passageway.

4. A torch head according to claim 3, wherein said socket includes a base portion communicating with said oxygen port, an intermediate portion communicating with said fuel gas port, and an outer end portion threaded to receive a mounting nut; said sleeve is formed with a stop engageable by said nut to removably maintain said rearwardly disposed end portion seated within said socket into engagement with an annular sealing surface formed adjacent the juncture of said intermediate and outer end portions of said socket; and a spring device is arranged to axially bear on said sleeve and said inner portion for biasing said rearwardly disposed end into engagement with an annular sealing surface formed adjacent the juncture of said base and intermediate portions of said socket.

5. A torch head construction according to claim 2, wherein said inner assembly includes an additional valve device carried by said inner portion and arranged in said fuel gas passageway for permitting flow therethrough only when pressure within said fuel gas chamber exceeds pressure adjacent a forwardly disposed end of said fuel gas passageway, and a portion of said additional valve device cooperates with said sleeve to position said inner portion concentrically within said sleeve.

6. A torch head according to claim 2, wherein said inner assembly includes an additional valve device carried by said inner portion within said through opening rearwardly of said seat of said valve device for normally blocking flow in said oxygen passageway in a direction towards said oxygen chamber.

* * * * *